May 6, 1941.    H. F. ELLIOTT    2,240,499
PRESELECTOR MECHANISM
Original Filed June 4, 1937    6 Sheets-Sheet 1

Inventor:
Harold F. Elliott
By Foorman L. Mueller
Atty.

May 6, 1941.  H. F. ELLIOTT  2,240,499
PRESELECTOR MECHANISM
Original Filed June 4, 1937  6 Sheets-Sheet 4

Inventor:
Harold F. Elliott
By: Foorman L. Mueller
Atty.

May 6, 1941.    H. F. ELLIOTT    2,240,499
PRESELECTOR MECHANISM
Original Filed June 4, 1937    6 Sheets-Sheet 5

Inventor:
Harold F. Elliott
By: Foorman L. Mueller
Atty.

May 6, 1941. H. F. ELLIOTT 2,240,499
PRESELECTOR MECHANISM
Original Filed June 4, 1937 6 Sheets-Sheet 6

Inventor:
Harold F. Elliott
By: Foorman L. Mueller
Atty.

Patented May 6, 1941

2,240,499

UNITED STATES PATENT OFFICE 2,240,499

PRESELECTOR MECHANISM

Harold F. Elliott, Palo Alto, Calif.

Original application June 4, 1937, Serial No. 146,359, now Patent No. 2,190,832, dated February 20, 1940. Divided and this application November 9, 1938, Serial No. 239,696

30 Claims. (Cl. 200—37)

My invention relates in general to time controlled apparatus for operating various types of controllable equipment in accordance with a predetermined control program.

For convenience in description the invention will be considered more particularly with relation to its application to a radio receiver and the various descriptive term applied to the apparatus and the elements thereof will be chosen as connected with this application. It is understood that this invention is not limited to an application with radio receivers but may be used with many types of controllable equipment. The present application is in part a division of my copending application which has issued into patent No. 2,190,832, dated February 20, 1940, and relates to my copending applications, Serial No. 82,494 and Serial No. 82,495, both filed May 29, 1936, the first of which has issued as patent No. 2,201,162, dated May 21, 1940.

An object of the present invention is to provide an improved time-controlled preselector device for use with controllable apparatus of various types.

A further object of my invention is to provide such a device in a compact, rugged form which not only is extremely flexible in adaptation and efficient in operation, but also presents a pleasing and unique appearance so as to add to the ornamental features of the structure to which it is adapted.

A still further object of my invention is to provide a time-controlled preselector device which is capable of setting to a predetermined program in a rapid, positive, and simple manner.

Other objects and advantages of my invention will be apparent from the following description taken with the drawings, in which.

In practicing my invention, I provide a preselector device having in combination, preselector mechanism, a time device, and a stationary cage-like formation of two sets of intercrossed but insulatingly separated electrical conductors, with one set of conductors adapted to be connected to the apparatus to be controlled thereby and the other set of conductors connected into an electrical circuit including the time device for operating the controllable apparatus on a timed schedule. Interconnectors for the two sets of conductors are provided to complete a circuit through corresponding preselected conductors and such interconnectors are set to a predetermined schedule by the manually operated preselector mechanism including a pair of rotatable members having position indications therewith operatively connected with said interconnectors by rotatable and linearly moving means. One of the members is rotatable selectively either clockwise or counter-clockwise, with one rotational direction of movement acting to individually set the interconnectors to predetermined positions, and movement in the other direction causing all of the set interconnectors to be moved to non-connecting position.

Figures 1, 11, 12:
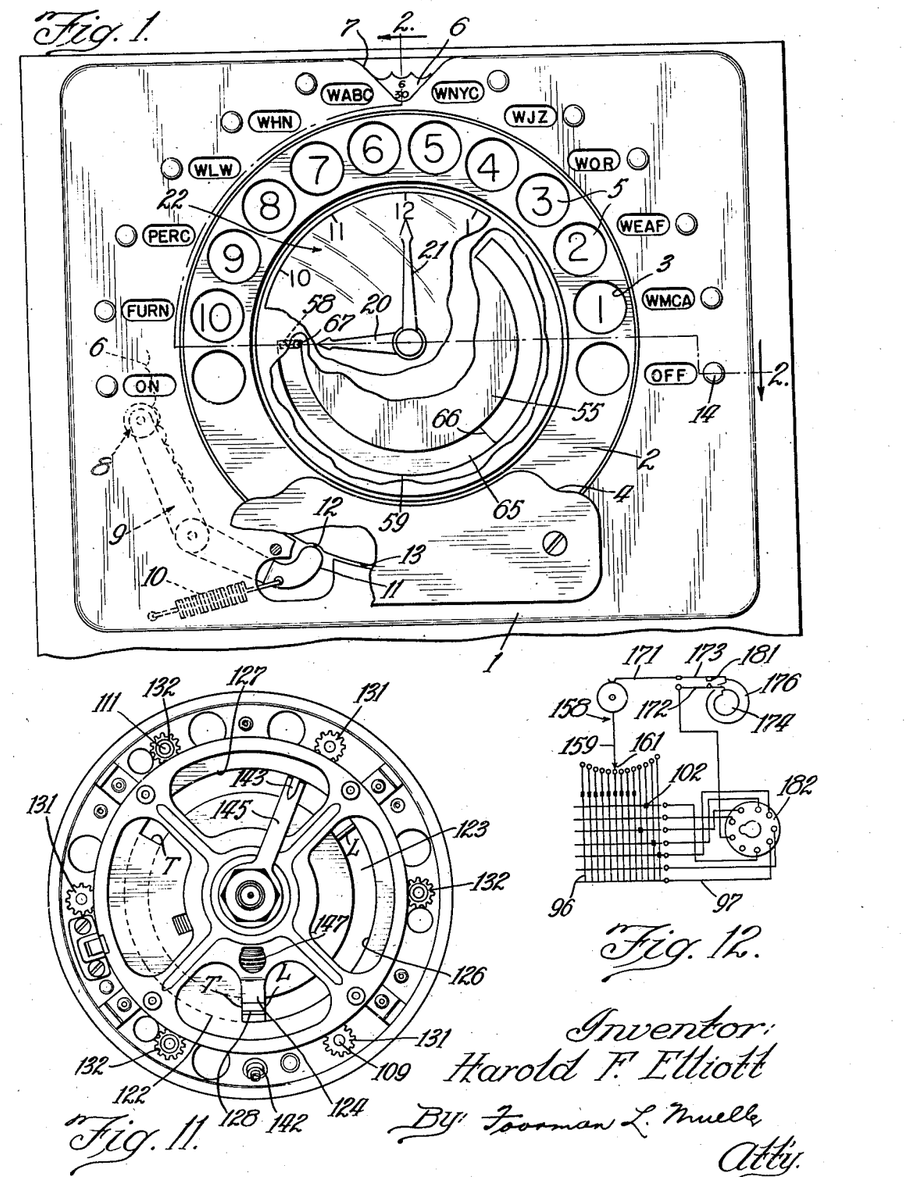
Fig. 1 is a front elevation of the preselector device with a portion of the device broken away to show some of the internal structure.
Fig. 11 is a front elevation of the selector mechanism with the clock face and station dial removed.
Fig. 12 is a diagrammatic illustration of a portion of the complete circuit of the modification illustrated in Figs. 5 to 11, inclusive.

In the specific embodiment of the invention, and referring initially to Fig. 1, numeral 1 represents the case enclosing the preselector unit, shown here in front elevation. This preselector unit comprises a rotatable station index dial 2, having finger holes as 3, and a stop 4, by which it may be rotated varying angular amounts, according to the finger hole chosen, similar to an automatic telephone dial. Tabs, as 5, are provided for indicating the names of the stations from which the preselector and the balance of the system are arranged to intercept and translate. A rotatable time index dial 6 concentric with and behind the station index dial 2 is arranged so that it may be observed and operated through a suitable slot 7 in the top of the case 1. This time index dial, 6, is preferably notched and graduated in 96 quarter hour intervals, one for each 15 minutes of the 24 hours of a day, the notches being provided at the peripheral edge and the graduations being imprinted or impressed on the front face of the dial next to said edge. A roller 8 adjacent the periphery of the time index dial, and mounted on a pivoted crank arm 9, is urged by a spring 10 toward the periphery and will ride from notch to notch and seat in a notch when the dial comes to a standstill, thereby providing means for stopping the time index dial precisely at the quarter hour points.

In order that the mechanism operated by these index dials, as described hereinafter may not be thrown into disorder by improper manipulation of the dials, a mechanical interlock, 11—12, is provided and arranged so that the time index dial 6 can be rotated only when the station index dial 2, is in neutral position. One exemplification of an interlock is shown in Fig. 1, wherein station index dial 2 is illustrated at neutral position with a finger 11 on the crank arm 9 adjacent a notch 12 in the station index dial but out of direct engagement therewith. As the roller 8 is on one end of said crank arm and finger 11 on the other end with the arm pivoted between said ends, said finger 11 must register with its notch 12 to permit any swinging of the arm. In this neutral position, finger 11 can enter notch 12 permitting roller 8 on the other end of crank arm 9 to be lifted and slide over the notches in time dial 6. If station dial 2 is in any other position, finger 11, hits the peripheral edge 13 of station dial 2, the pivoted movement of the arm 9 is limited and the roller 8 cannot be lifted far enough to permit rotation of time dial 6. The same action prevents station dial 2 from being rotated unless the time dial 6 is accurately positioned with roller 8 at the bottom of one of the 96 notches of the time dial.

Figure 2:
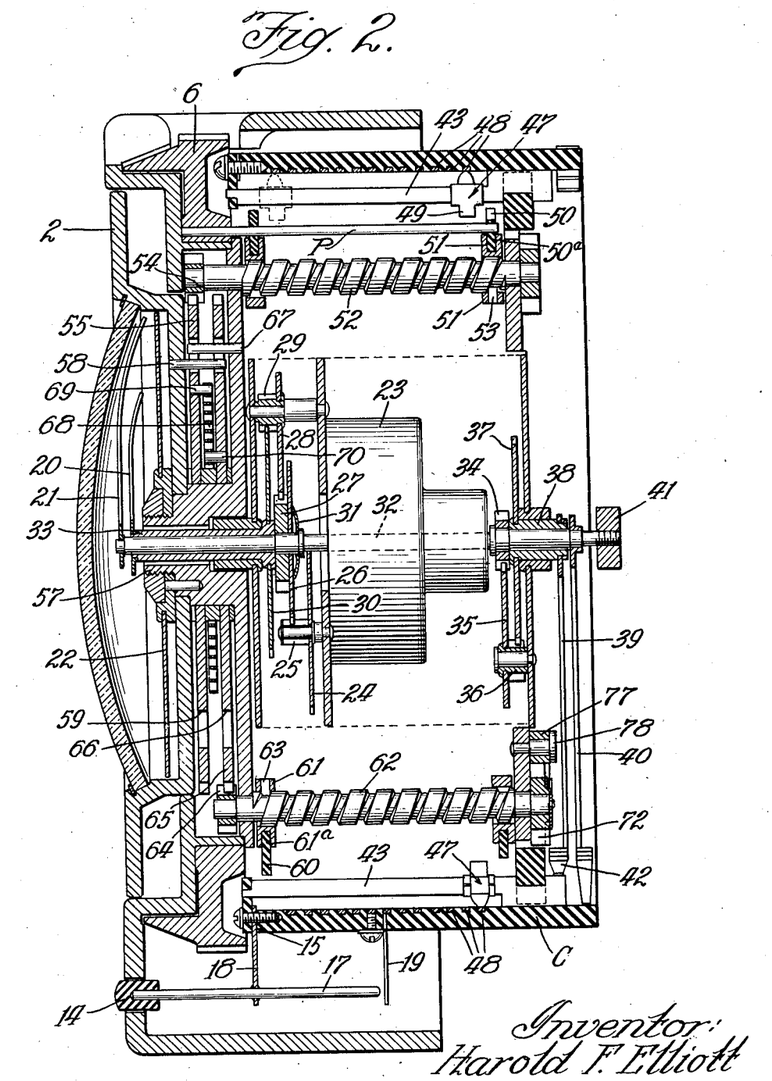
Figure 2 is a sectional view along the line 2—2 of Fig. 1.
Figure 4:
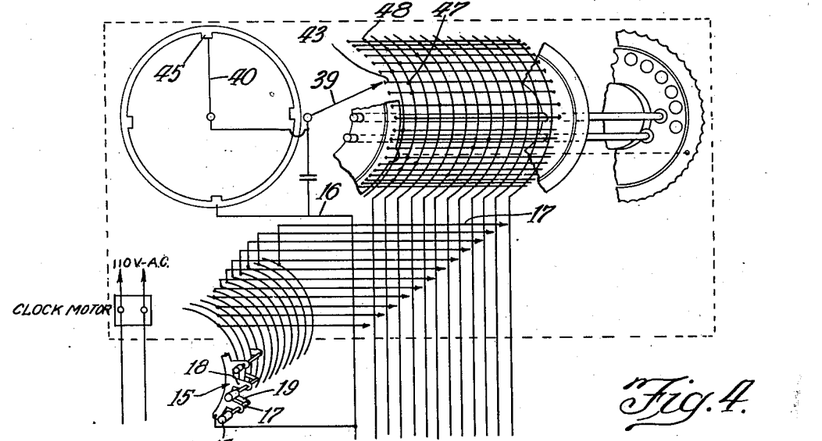
Fig. 4 illustrates diagrammatically the preselector device of the Figs. 1 to 3, inclusive, and circuit therefor, together with the circuit leads extending therefrom for connection with controllable apparatus.

Although the preselector device of Figs. 1 to 4 normally acts automatically to control apparatus connected therewith, manual operation can also be accomplished as illustrated in Figs. 1, 2 and 4. Push-buttons 14 for manual operation are provided extending through the front plate of the case for the device with each supported by a comb-like conductor member 15 connected to one side of the complete control circuit through a conductor 16 (Fig. 4). Each button 14 is directly supported on a shaft 17 which in turn is secured to a finger 18 in the comb. Each of the fingers 18 is provided with the remainder of the comb in a resilient material which tends to hold a button 14 and its associated shaft 17 in idle position out of engagement with the contact member 19 (Fig. 2) in electrical contact with a corresponding station conductor or ring on the preselector as will be more fully understood hereinafter. A button 14 may be pressed inwardly in the usual manner to complete the control circuit through the station conductor corresponding to such button so as to energize an operating structure for the radio receiver to which the preselector is connected and tune the receiver to a station corresponding to the conductor. When the operator's finger is removed from the button 14, the resiliency in the metal finger 18 for that particular button returns the shaft 17 and the button to normal idle position. With this portion of the preselector device it is possible to adjust the receiver or other controllable apparatus to a desired control position entirely independent of any question of time. The automatic operation of the preselector device is, of course, accomplished in accordance with a predetermined time and function pattern.

Turning now to Fig. 2, the preselector mechanism embodies a clock, preferably of the self starting synchronous electric type, having hour and minute hands 20 and 21, respectively, face or dial 22, motor 23, and a suitable train of reduction gears, including interconnected gears 24, 25, 26, 27, 28, 29 and 30. The motor 23 drives gear 24, and pinion 25 attached to gear 24 drives a floating gear 26. This in turn drives a pinion 27 by friction between gear 26 and pinion 27, with a spring 31 acting on gear 26 maintaining suitable pressure to assure such friction. Pinion 27 is attached to a shaft 32 which carries the minute hand 21. For convenience the axis of this shaft will be designated the main axis for the apparatus.

The hour hand 20 is attached to a hollow shaft 33, which in turn is rotatably carried on shaft 32 and axially coincident therewith, and is driven through a 12 to 1 reduction gear chain comprising a pinion 27, gear 28, pinion 29 and gear 30 likewise attached to shaft 33. The central shaft 32 is extended rearward through hollow shaft or bushing 33, and has attached to it pinion 34 which, with gear 35, pinion 36, and gear 37, make up a 24 to 1 reduction system between a contact making hour hand 39 and a contact making minute hand 40. Gear 37 is attached to the hollow shaft 38 and this in turn has attached to it the contact making hour hand 39. The contact making minute hand 40 is attached to the central shaft 32, and a knob 41 on shaft 32 provides for rotating said shaft for setting the clock. The contact making hour hand 39 carries at its outer end a brush 42 which is arranged to contact successive time busses or conductors as 43, at quarter hour intervals. These busses 43 are in a cylindrical series or group concentric with the main axis of the station and time dials and at less radial distance from the axis than the concentric series of push buttons 14 above mentioned (Figs. 2 and 3).

Figure 3:
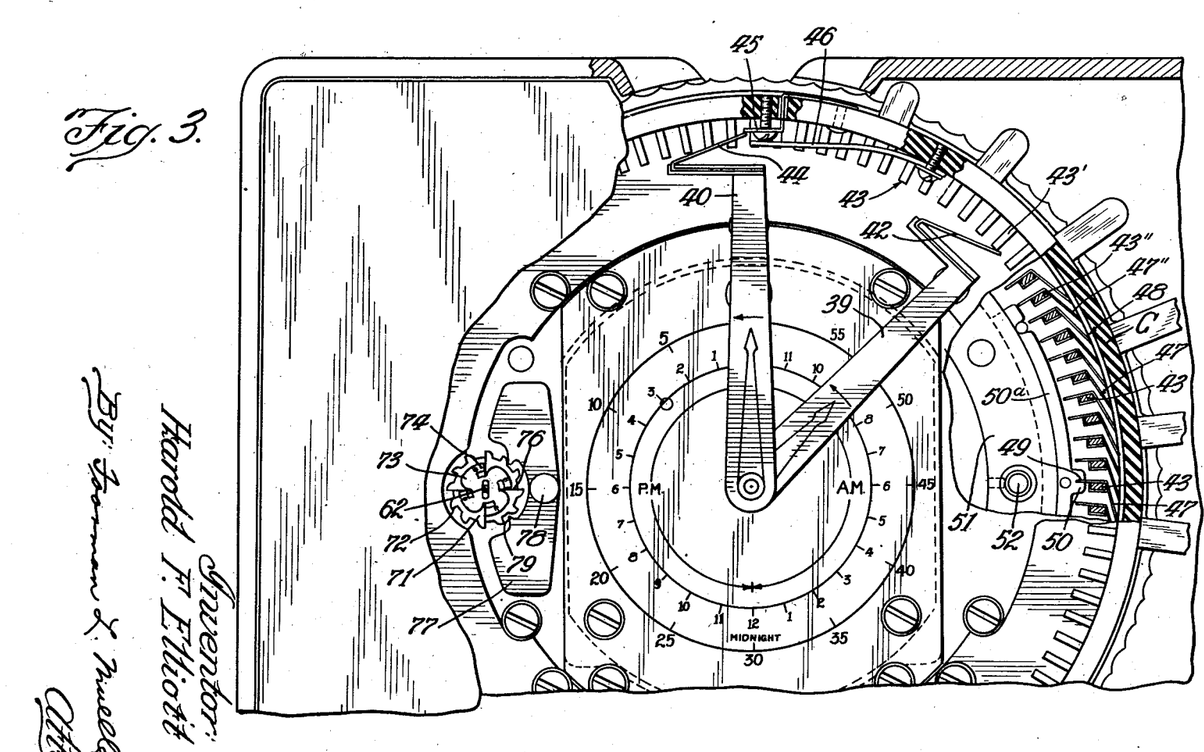
Fig. 3 is a view in elevation and partially fragmentary, of the rear of the structure of Fig. 1. To assist in the understanding of the contact hand structure, such hands are spaced apart angularly as contrasted to the aligned position of the same as in Fig. 2.

A rear elevation of the preselector is shown in Fig. 3 where may be observed an elevation of the contact making hour hand 39, the outer end of which is directed laterally in the direction of rotation so as to mount a flexible brush 42 thereon which slopes radially outward and rearwardly to successively contact the ends of time busses or conductors 43 (one at a time) as the hand rotates. The particular bus contacted in Fig. 3 is, for reference purposes identified by numeral 43'. The time busses are in an annular series insulated and spaced from each other, with the inner ends all substantially ending at the same radial distance from the center of rotation of the hands or main axis. There are preferably ninety-six of the time busses, 43, evenly spaced in a complete circle, and, with the hand 39 geared to make one revolution in twenty-four hours, contact will thus be maintained by the brush with each bus for a period of approximately fifteen minutes at which time the brush snaps from one bus to the next. It is understood that the number of busses or conductors 43 may vary in accordance with any desired time pattern.

The contact making minute hand 40 is similar in construction to the hour hand in that it also has a lateral brush 44 thereon which slopes radially outward and rearwardly. The brush 44 is arranged to make a contact of a few seconds duration every fifteen minutes with successive ones of four circumferentially spaced contact blocks, one of which is shown at 45. The brush 44, slides along a relatively fixed insulating strip 46 which slopes forwardly and inwardly, and then drops off of the end of this strip onto a contact block 45, closing a circuit under the control of these contacts every fifteen minutes. After a few seconds engagement determined by the length of the block 45, brush 44 drops off the end of the contact block 45, breaking the circuit with a quick break action, minimizing sparking. During the interval of contact of the brush 44 with contact block 45, a connection is made from block 45, through brush 44 and minute hand 40 to hour hand 39 and thence through brush 42 to a time bus as 43. The circuit thus formed may then be routed to select a broadcast station through the medium of an interconnector 47, which has previously been moved to a selecting position along the contacted time bus 43, to cross connect with a predetermined station bus as 48. An elevation of this arrangement is shown at the upper portion of Fig. 3 for one of the time busses, particularly designated as 43″. The corresponding particular interconnector 47″, comprises, as do the remaining interconnectors, a suitably formed metallic stamping arranged to slide longitudinally along the time bus 43″, and to make contact between this bus and any one of the plurality of circular station busses 48. The station busses or conductors 48 comprise spaced circular metallic rings electrically separate and concentric with the main axis of the apparatus. The station busses or conductors are molded or otherwise secured, in a cylinder C of insulating material. The interconnectors, slide along the time busses and provide means for setting up any desired system of cross connections between time and station busses.

As previously explained, the hands 39 and 40 are illustrated in an axially aligned position in Fig. 2, while in Fig. 3, for purposes of clarity the hands are moved so as to be spaced apart angularly and not with one directly behind the other.

A sectional view of the time and station bus arrangement is shown in Fig. 2, wherein at the bottom of the figure, one of the time busses 43 is shown overlying and in spaced relation to a plurality of station busses embedded in the insulative mounting C therefor. On time bus 43 is shown an interconnector 47 which slides along such bus for electrically cross connecting busses 43 and 48. Now it will be evident that by providing each time bus 43 including those designated particularly as 43′ and 43″, with a sliding interconnector such as 47″, all considered as designated by the general reference character 47, for each quarter hour of the twenty-four hour day, and by providing a station bus or ring-like conductor 48, for each station it is desired to receive, cross connections between selected time and station busses may be arranged to route a control circuit to select given stations at selected times. The preselector structure of the present invention may be connected with apparatus as described in my copending application, Serial No. 146,359, for tuning the receiver to bring preselected stations at preselected intervals, or may be connected with any other suitable apparatus. A description will be given, however, of the mechanism whereby the station dial 2 and time dial 6, described originally in connection with Fig. 1, are utilized for setting the interconnectors to cross connect selected time and station busses or conductors.

Referring now to the right-hand center of Fig. 3 and upper right-hand corner of Fig. 2, there is shown one of the time busses 43 carrying a sliding interconnector 47. These elements are of course all of the same construction throughout the preselector apparatus. Each interconnector has a projecting lug 49 arranged to lie in the path of a selector finger 50. This selector finger is preferably provided as an integral part of a larger member 50a of insulating material which is slidably mounted in the groove 51a of a ring 51. Ring 51 is in turn mounted upon and operatively connected with three lead screws, one of which is shown at 52, the other two screws being positioned 120° either side of screw 52, parallel therewith, and at the same radial distance from the axis of shaft 32, thus carrying ring 51 with a three point support. Three pins 53, one for each lead screw, are carried in the ring and project radially of the ring and respective lead screws, into the respective thread grooves thereof and thus provide for moving the ring longitudinally or in an axial direction when the lead screws are rotated. Pinions, as 54, connect the three lead screws 52 with a gear 55, so that the three lead screws rotate in unison. It will be evident that clockwise rotation of gear 55 will cause counter-clockwise rotation of the three associated lead screws 52, and that this will cause linear motion of ring 51, moving it to the left from the position shown in Fig. 2. (The directions of rotation are specified viewing the apparatus from what is here termed the front, which is at the left in Fig. 2.) Ring 51 carries with it selector finger 50, so if ring 51 is moved to the left, finger 50 will engage lug 49 and move interconnector 47 to the left along the time bus 43, to bring it successively in contact with the plurality of station busses 48.

The station index dial 2, Figs. 1 and 2, is arranged to rotate about the main axis upon hub 57, Fig. 2. A pin 58 attached to and projecting rearwardly from dial 2, extends through an arcuate slot 59 in gear 55 in such a manner that when dial 2 is rotated from neutral position in a clockwise manner (viewed from the front) it carries with it gear 55, rotating the latter clockwise. The gear 55 rotates the lead screws 52 counter-clockwise, and moves ring 51 and selector finger 50 to the left. This in turn carries along to the left any interconnector 47 that lies in its path. Thus, if an operator inserts his finger in the hole marked 1 in Fig. 1, which is the second hole in the dial, and rotates dial 2 clockwise until stop 4 is reached, an interconnector will be moved along a time conductor until a corresponding station conductor 48 is reached. As illustrated herein, this would be the second station conductor from the right as viewed in Fig. 2.

In order to move a particular interconnector along a particular time conductor, selector finger 50 (Fig. 2) may be placed opposite the desired interconnector by rotating time dial 6 which in turn rotates selector finger 50 through the medium of pin P, fixed to said dial and projecting rearwardly therefrom parallel to the main axis and having sufficient length to pass over groove 51a of ring 51 in all positions of the ring. A given time conductor may therefore be connected with a given station conductor by two simple operations: (1) rotation of the time dial 6 to the desired quarter hour, and (2) rotation of the station dial 2 for the desired station. These operations: (1) place the selector finger 50 opposite a selected interconnector on its corresponding time conductor and (2) advance the interconnector linearly to a selected station conductor. Then, when the clock reaches this particular quarter hour, a circuit as shown in Fig. 4 will be made through contact 45, hand 40 to hand 39, thence to a time conductor, as 43, and thence through the corresponding interconnector 47 thereon, to the selected station conductor 48. The station conductors are all individually connected into an energizing circuit, which in the case of a radio receiver may include a motor-driven tuner for operating the condenser or other tuning device for the receiver.

In order to place all interconnectors in a starting position preliminary to setting up a program of stations to be heard during a twenty-four hour period, or any other period desired, the unit is arranged so that all interconnectors may be moved to the right until the end bus 48, which is a neutral bus, is reached. Referring to the lower left portion of Fig. 2, an insulating ring 60 is rotatably mounted in the peripheral groove 61a of a transversely or linearly movable ring 61 similar to ring 51. The ring 61 rides upon three lead screws, one of which is shown at 62, the remaining two being 120° either side thereof parallel thereto and equally spaced from the main axis or shaft 32. Three pins 63, one for each lead screw, are secured in the ring 61 and project radially of the grooved ring 61 and respective lead screws 62 into the respective thread grooves of the screws, providing operative driving connection from the screws to the said ring, so that clockwise rotation of the screws 62 move ring 61, and, consequently ring 60 to the right. At their ends next to the operating dials, the three lead screws each have secured thereon, a pinion 64 which engages a single gear 65 rotatably mounted on hub 57. Rotation of gear 65 counter-clockwise (for clockwise rotation of the screws), is brought about by counter-clockwise rotation of station dial 2, Figs. 1 and 2, through the medium of pin 58, which engages gear 65 at one end of a slot 66 in said gear.

The construction as described thus provides for a neutral, normal or rest position for dial 2 with the rearwardly extending pin 58 carried thereby always positioned in arcuate slots 59 and 66 in the parallel pair of gears 55 and 65 respectively. At this rest position of station dial 2, pin 58 is engaged at opposite sides by end edges of the two said arcuate slots 59 and 66, one slot extending away from the pin in one direction and the other slot extending away from the pin in the opposite direction. When the station dial 2 rotates in one direction pin 58 moves freely in one slot but engages the end edge of the other slot as a stop to cause that gear to rotate with the dial 2, and conversely, when the dial 2 is rotated in the opposite direction the gear just mentioned remains stationary and the other one is rotated. In the specific disclosure, the arrangement is such that clockwise rotation of dial 2, causes clockwise rotation of gear 55, while gear 65 remains stationary against stationary pin 67 carried in the preselector frame, and counter-clockwise rotation of dial 2 causes counter-clockwise rotation of gear 65 while gear 55 remains stationary against pin 67. In Fig. 1 portions of clock face 22, and dial 2 are broken away to show gear 55, slot 59 and pins 58 and 67. Gear 65 back of gear 55 may be seen through slot 59 as may also slot 66 in gear 65.

Returning to Fig. 2, a spiral spring 68 situated between the two parallel gears 55 and 65 has one end secured by a pin 69 to forward gear 55 and has its other end secured by pin 70 to rearward gear 65. This spring 68 is arranged so that in neutral position of dial and gears, the dial, gears, lead screws, rings, etc., are held in the positions shown in Fig. 2, and are moved therefrom by rotation of dial 2 as already described. The spring returns all gears, lead screws and rings to the neutral or idle position, as shown, when dial 2 is released after rotation. In order to retard this return motion under spring tension, a retarding mechanism such as a governor or escapement may be mounted upon one lead screw of each set of screws, as shown in Figs. 2 and 3. The particular escapement mechanism chosen for this disclosure may conveniently comprise an escapement wheel 71, with suitable peripheral teeth 72. The wheel 71 is mounted rotatably upon the part to be retarded, in one instance on a cylindrical end portion of screw 62 for one set of lead screws, and in the other instance on a similar cylindrical end portion of screw 52 at the rear of the apparatus for the other set of lead screws. A ratchet wheel 73 is rigidly mounted upon the end of each such cylindrical portion, with a spring pawl 74 for the ratchet wheel pressing against the end face juxtaposed thereto of escapement wheel 71 as shown in Fig. 3. The end face provides radial shoulders or notches 76 which the pawls will ride over when rotating in one direction but which will be engaged by the pawls when rotation is in the other direction. As shown, the screw 62 will, therefore, be relatively free to rotate in a counter-clockwise direction (as viewed in Fig. 3) but when rotating clockwise, the screw actuates the escapement wheel by virtue of engagement of the pawls against the notches of said wheel. An escapement rocker 77 overlies escapement wheel 71, being pivoted at 78 and having escapement teeth 79 to cause the rocker to teeter back and forth as escapement wheel 71 rotates. The rocker has adequate mass to obtain the desired amount of retarding effect upon the screw and connected parts. The escapement shown permits free forward motion, but retards the return motion, thereby minimizing rebound.

A modified embodiment of my invention is illustrated in Figs. 5 to 12, inclusive. This modified embodiment, similar to the structure in Figs. 1 to 4, inclusive, includes a preselector mechanism supported within a drawn housing 85 for mounting in any desired manner as a panel 86. A clock 87 is supported within the preselector frame which includes a stationary annular ring 88 and a cup-shaped base 89 spaced apart in fixed relation by a plurality of spacing posts 91 extending between the same. The clock 87 drives a pair of hands 92 and 93 for indicating the minutes and hours respectively on a clock face 94 at the front of the preselector device. The clock 87 is a twelve-hour clock in the illustrated embodiment, but to assist in setting up the program over a twenty-four hour period, divisions for twenty-four hours are provided around the outside edge of the dial face. The clock also acts to drive electrical contact mechanism as will be hereinafter described, to complete circuits through an interconnecting conductor system including a plurality of axially extending time conductors 96 corresponding in number to fifteen-minute intervals over the twenty-four hours, and ring-shaped conductors 97 corresponding in number to the desired number of broadcast stations which it is desired to control. As previously explained, the entire mechanism is described as being applied to a radio receiver, but the station rings or conductors can also correspond to any desired control function such as controlling the operation of a furnace, household appliances of many types, machinery, control equipment, and the like. The station rings are all embedded and insulatingly separated in an annular member 98 of insulating material. Lugs 99 extend inwardly from such insulating member from a connection with the individual station rings for connecting the rings 97 into an operating circuit as will be explained. The time conductors are supported upon frame members 101 of insulating material and when completely assembled comprise a substantially open annular cage-like structure. An electrical connection between a desired time conductor and station ring is accomplished by means of a sliding interconnector 102 similar to interconnector 47 in Figs. 2 and 3, on each time conductor 96.

Figure 9:
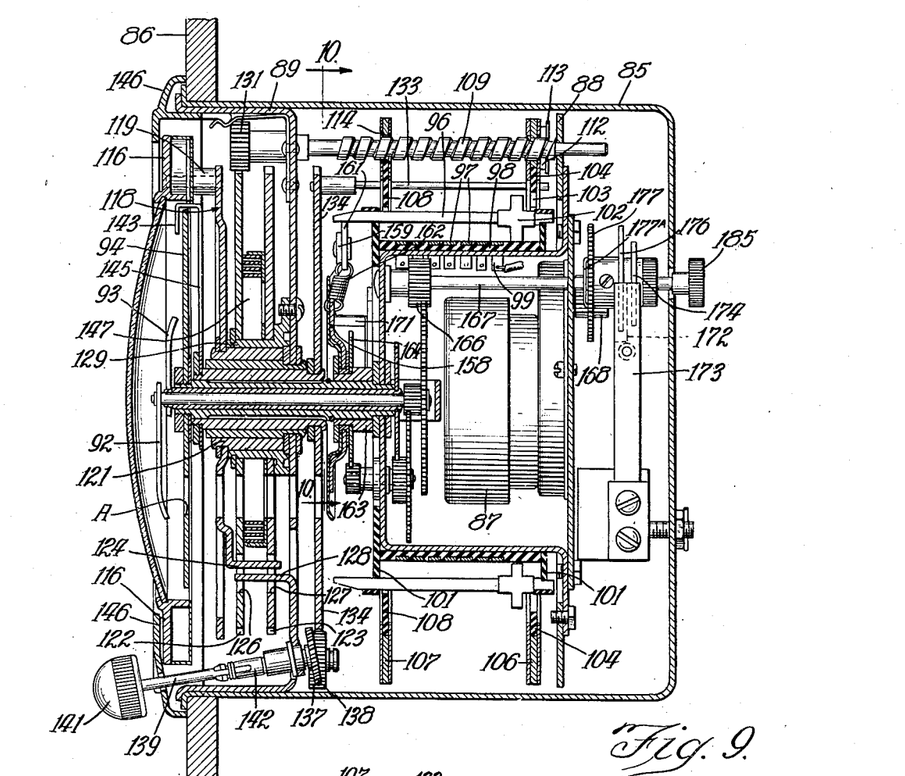
Fig. 9 is a sectional view of the complete preselector device taken along the line 9—9 of Fig. 6.
Figure 10:
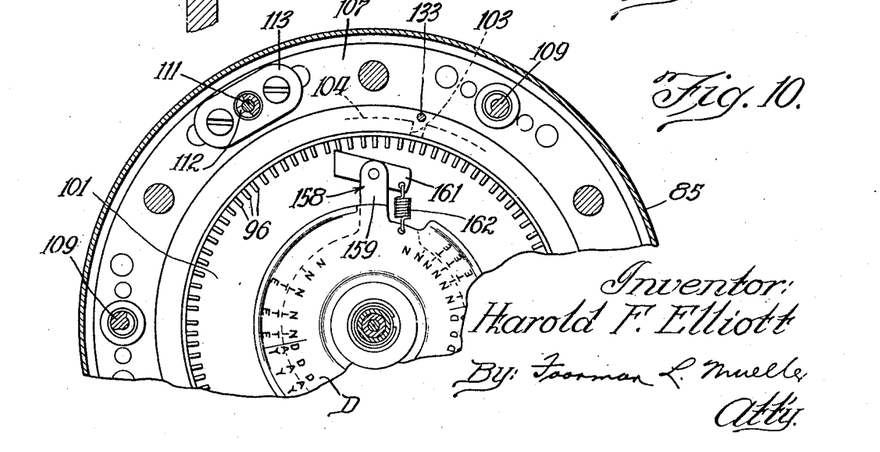
Fig. 10 is a vertical sectional view along the line 10—10 of Fig. 9, and looking in the direction of the arrows on such line.

The preselector device may be set up to operate according to a predetermined station and time pattern by setting the interconnectors 102 into a predetermined position relative to the time conductors and station rings, as explained with reference to the structure in Figs. 1 to 4, inclusive. This setting operation is accomplished in substantially the same manner as previously explained by means of a selector finger 103 integral with an insulating ring 104 rotatably carried in a groove in the multi-part setting ring 106. The setting ring 106 is identical with a cancelling ring 107 which also has an insulating ring 108 rotatably carried therein. The rings 106 and 107 are linearly movable by means of three lead screws as 109 for the setting ring 106, and a set of three identical lead screws 111 for the cancelling ring 107. Each of such rings 106 and 107 is connected with its respective set of three lead screws by means of lugs 112 on discs carried rigidly on the rings intermediate the face of the ring and a cover plate 113 as shown particularly in Figs. 9 and 10. The lugs 112 ride in the spiral grooves on the lead screws. As shown at the top of Fig. 9, the lead screw 109 extends through an aperture 114 in the cancelling ring 107 so that movement of the lead screw or movement of the ring 107 can be accomplished independently of the other. This same situation is true of the lead screws 111 for the cancelling ring 107 which extend through corresponding apertures in the setting ring 106.

One set of lead screws as 109 are rotated in a counter-clockwise direction upon rotation of a station dial 116 in a clockwise direction, while the lead screws 111 are simultaneously rotated in a clockwise direction upon rotation of such station dial 116 in a counter-clockwise direction. The station dial 116 (Fig. 6) comprises an annular ring having a plurality of finger holes 117 therein, and is fixedly secured on a support disc 118 by suitable securing means extending through the ring and into a plurality of knobs 119 on the support disc. The support disc 118 is fixedly secured to a bushing 121, and operatively connected to a pair of operating gears 122 and 123 for connection with the setting lead screws 109 and the cancelling lead screws 111, respectively. This connection is accomplished by means of an integral lug 124 positioned in arcuate slots 126 and 127 in the gears 122 and 123, respectively, with such slots extending arcuately in opposite directions from the lug 124 when the mechanism is in idle position. As shown in Fig. 11, slot 126 extends for more than 180° from T to T, while slot 127 extends for more than 180° from L to L. Adjacent ends of these slots are in engagement with the lug 124 when in idle position and such lug in engagement with an end of a slot causes movement of one gear or the other depending upon the direction of rotation of the station dial 116. A stop lug 128 integral with the cup-shaped member 89 likewise extends through the slots in the two gears, 122 and 123, to limit the return of such gears after they have been operated. The position of the stop lug 128 corresponds with the position of the driving lug 124 when the mechanism is in idle position. The gears 122 and 123 are rotatably carried on the outside of a bushing shaft 129 as is shown in Fig. 9.

The gear 122 is connected with the lead screws 109 through pinion gears 131 secured on the ends of each of such lead screws. Similar pinion gears 132 are secured on the ends of the lead screws 111 for engagement with the rotatable cancelling gear 123. As previously explained, the setting ring 104 is provided with a selector finger 103 for individually engaging one of the plurality of sliding interconnectors 102. The finger 103 is moved to a setting position in alignment with an interconnector 102 by means of rod connections 133 extending from the insulating ring 104, through the insulating cancelling ring 108 for fixed connection with a time gear 134 which in turn is secured to a bushing 136 in the general bushing assembly at the center of the mechanism. The time gear 134 is rotated by means of a relatively wide pinion gear 137 which is directly driven by a thinner pinion gear 138 standing at an angle therewith, as shown in Fig. 9, so that the drive shaft for the gear 138 which includes a removable pin 139 with a finger knob 141 on the end thereof entirely clears the station dial 116 in its rotary movement. The pin 139 fits into, and is keyed against rotary movement with relation to a socket 142 connected with the gear 138. A pointer 143 integral with a hook-shaped arm 145 secured to the bushing 136, moves over the clock scale upon rotary movement of the time gear 134 by the knob 141, and such pointer is aligned with the finger 103 so as to indicate on the clock face the particular quarter-hour-interconnector 102 with which the finger 103 is aligned.

With the finger 103 in a desired setting position the operator of the preselector device engages a desired indexed finger hole 117 in the station dial 116 and rotates such dial clockwise until the operator's finger engages a stop shoulder 144 on a cover plate 146 frictionally retained in the base 89 (see top of Fig. 9). The rotary clockwise movement of the station dial 116 is transmitted through the setting gear 122 and pinions 131 to rotate the lead screws 109 in a counter-clockwise direction and move the setting ring 106 with the selector finger 103 on the ring 104 therein in a linear direction. The linear distance of movement of the selector finger 103 is proportional to the rotary distance of movement of the dial 116. This slides the selected interconnected 102 to a station ring 97 indicated by the index tab marking carried in a finger hole 117. This station correlation is, of course, predetermined in originally connecting up the preselector device to the radio receiver. In the particular structure illustrated in Figs. 5 to 12, inclusive, seven annular rings 97 are shown. The first ring at the right side of the device as shown in Fig. 9 is an "off" ring. When the interconnector 102 is in the position illustrated in Fig. 9 it is simply in a neutral position so far as the control circuit is concerned. With the finger of the operator in the first finger hole 117 with the index tab "off" (Fig. 6), however, the station dial may be rotated clockwise and one of the interconnectors 102 set on the "off" ring. This setting operation for any station or for "off" position may be repeated for each of the quarter-hour intervals over the twenty-four hour period or the interconnectors may be set for only a relatively short period of time. The non-set interconnectors 102 may stand at neutral position on the insulating ring 98, which is the position of the interconnector in Fig. 9. After an operator's finger is brought against the shoulder 144, the finger may be withdrawn from the hole 117 or the operator's hand may simply follow the return movement of the station dial to idle position. The return movement is accomplished by a spiral spring 17 connected at one end to the setting gear 122 and at the other end to the cancelling gear 123. As the setting gear is moved in a clockwise direction, the spring is wound up or put under compression at the same time and this force tends to return the setting gear and station dial to idle position. The same procedure is followed with the cancelling gear 123 as will be hereinafter explained.

Figures 6, 7, 8:
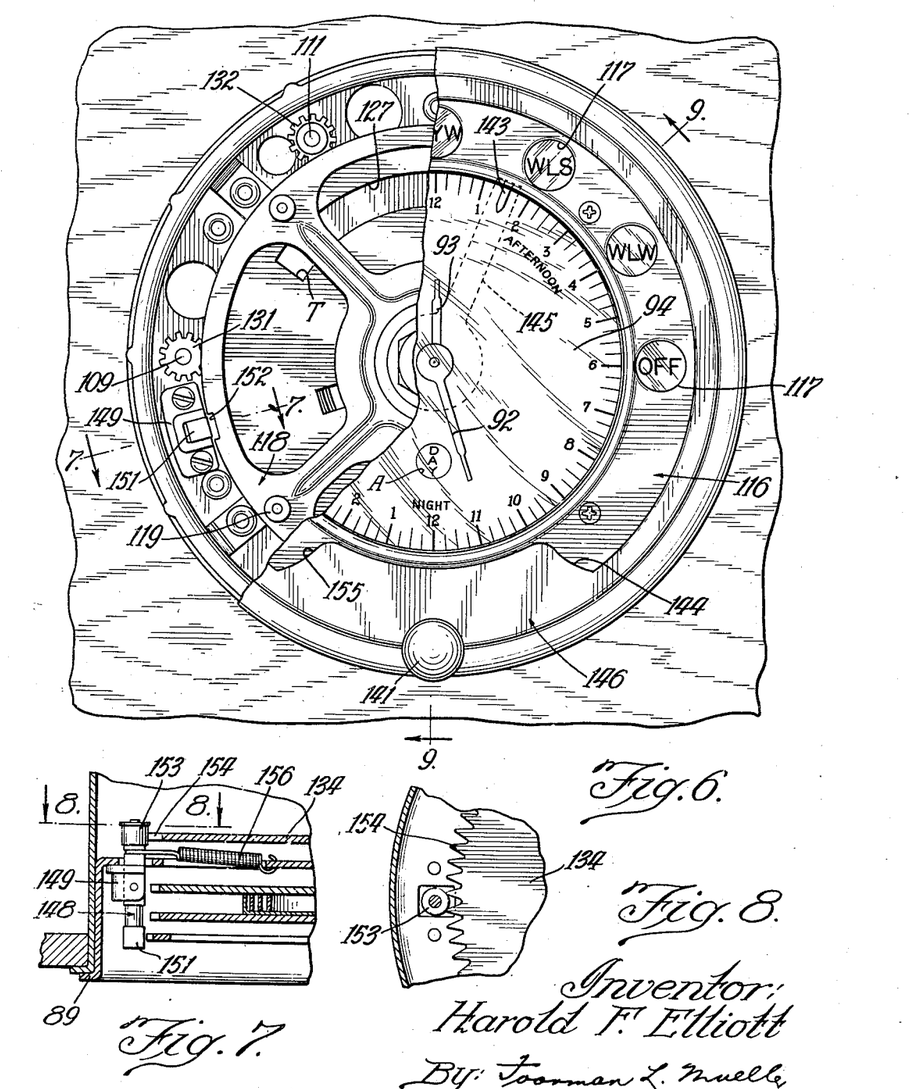
Fig. 6 is a front elevation, with a portion broken away, of the modification of Fig. 5.
Fig. 7 is a fragmentary sectional view of interlocking elements for the preselector device taken along the line 7—7 of Fig. 6.
Fig. 8 is a fragmentary plan view, partly in section, of an interlocking element taken along the line 8—8 of Fig. 7.

In order to prevent any possibility of jamming the mechanism of the device by careless operation, I provide interlocking mechanism between the support disc 118 through which the setting force is originally applied, and the time gear 134. The jamming might occur if an attempt was made to rotate the selector finger 103 to a new setting when it was being linearly moved by rotation of the lead screws 109. The interlock mechanism is illustrated particularly in Figs. 6 to 8, inclusive, and includes a pivoted lever 148 pivotally supported in a bracket 149 secured to the cup-shaped base member 89. The lever has a squared end 151 for seating in the correspondingly shaped notch 152 at the edge of the support disc 118, and has a roller 153 rotatably secured at the other end for engagement with the teeth 154 (Fig. 8) in the time gear 134. As the time gear 134 is rotated, and the roller 153 riding on the teeth reaches the peak of a tooth, the lever 148 is pivoted so as to move the squared end 151 into locking engagement with the notch 152 and prevent rotary movement of the support disc 118. A spring 156 acting on the lever 148 maintains the roller in engagement with the teeth 154 of the time gear. In order to prevent rotary movement of the time gear 134 during the rotary movement, either clockwise or counter-clockwise, of the support disc 118, the notch 152 is moved out of alignment with the squared end 151 and the position and dimensions of these elements are such that the squared end will strike the periphery of the support disc 118 and prevent pivotal movement of the lever sufficiently to permit the time gear 134 to be rotated past the roller 153. The roller 153 remains seated intermediate two teeth 154 as shown in Fig. 8 and also acts to stop the time gear directly on a time interval graduation, in this case, a fifteen-minute interval.

At any time that it is desired to change the control program through the preselector device, one connector 102, or all ninety-six connectors 102 may be collectively moved from a set position between a predetermined time conductor 96 and station ring 97 by means of the insulating ring 108. The insulating ring 108 carried in the clearing ring 107 has a diameter great enough so that it clears the tips of the interconnectors. Counter-clockwise movement of the station dial 116 will cause rotation of the cancelling lead screws 111 to carry the clearing ring toward the right as viewed in Fig. 9. The interconnectors 102 can be moved linearly toward the right in steps of the same length as they were moved toward the left, by clockwise movement of the station dial, depending upon the particular finger hole 117 engaged. Normally, however, it is desired to move all of the connectors 102 which are in set position completely to the right to neutral position as they are illustrated in Fig. 9. With a seven-finger hole configuration as provided in the illustrated embodiment, the finger hole furthest to the right lettered "Off" is engaged and the dial is rotated counter-clockwise until the operator's finger engages a shoulder 155 corresponding to shoulder 144. The return spring 147 which is secured at one end to the clearing gear 123 acts to return the station dial 116 and associated mechanism to idle position with the stop 128 in engagement with an end L of the slot 127 in the cancelling gear 123.

The circuit connections through the preselector device are apparent from a consideration of Figs. 9 and 12. A circuit including a preselected time conductor 96 and a preselected corresponding conducting ring 97 is closed and opened through a movable contactor assembly unit 158 including an arm 159 having a pivoted contact 161 at the top thereof which successively engages each of the time conductors 96 supported in the cage-like formation around the outside of the station rings 97. A spring 162 acts to maintain the contact 161 in engagement with the successive conductors. The contactor assembly unit 158, is insulatingly supported on a bushing 163 which likewise carries a gear 164 driven through a train of gears from driving gear 166 on a drive shaft 167. Such shaft is connected through gears with a pinion 168 on a stub shaft extending out of the clock 87. A spring washer 177A permits gear 177 to slip with reference to shaft 167 for setting the clock. As a result the gears in the clock which would add materially to the load are cut out. The gearing intermediate the drive shaft 167 and the contactor unit 158 is such that the contact 161 completes a single revolution once every twenty-four hours while clock hands 92 and 93 make one revolution per hour and one revolution in twelve hours, respectively. This period will, of course, vary in accordance with the total interval of time over which the preselector device is operated and can be made anything desired for specific purposes. A stationary brush 171 is in continuous contact with the contactor unit 158 completing the circuit thereto as is apparent from the circuit diagram of Fig. 12.

A circuit through a predetermined routing including a station ring 97, an interconnector 102, and a time conductor 96, and through the contactor unit 158, is closed or opened directly through a switch and cam structure including a pair of contact arms 172 and 173 riding on two corresponding cams of insulating material indicated by the reference characters 174 and 176. The cams are carried on a rotatable shaft assembly including a gear 177 in engagement with the driving gear 168 with a ratio between the same such that the cam shaft assembly rotates through a complete cycle each fifteen-minute interval. As is apparent from the illustration in Fig. 5, the shoulder 178 on the small cam 174 is rearwardly in the cycle of rotation with reference to the shoulder 179 on the cam 176. When the contact arm 173 is riding on the periphery of cam 176, and the contact arm 172 is riding on the periphery of the cam 174, these arms are separated at the contact portions 181 so that the control circuit through the entire preselector device is open. However, as the cams reach the position shown in Fig. 5 in their cycle of rotation, the contact arm 173 springs inwardly at the shoulder 179 of the cam 176 to cause engagement of the contact element 181. This closes a control circuit through the contact elements 181 and their corresponding contact arms 172 and 173, through the contactor unit 158 in engagement with a time conductor 96, through such time conductor 96, the corresponding interconnector 102, and thence through a station ring 97, having a connection therefrom through the tuning apparatus for actually tuning the radio receiver. The electrical connection to the tuning apparatus is made through the plug 182 shown in Fig. 12. The circuit remains closed for a few seconds until such time as the contact arm 172 falls off or springs inwardly from the high side of the cam 174 at the shoulder 178 so as to separate the contact arms and open the circuit through the contact elements 181.

When an interconnector 102 is on a ring 97 which is adapted to control a circuit to turn off the receiver rather than tune it to a particular station, the interconnector 102 being set there by clockwise rotation of the station dial 116 with the operator's finger in the finger-hole 117 bearing the designation "off" (Fig. 6), a circuit may be closed through such ring 97 and the time conductor 96 upon which the particular interconnector is slidable. The circuit also continues through the contactor and switch elements described above. This circuit may act to operate a relay or similar device to open the receiver circuit until the contactor unit 158 again connects with a time conductor 96 upon which an interconnector 102 has been set to a contact position with reference to a station connected ring 97.

Figure 5:
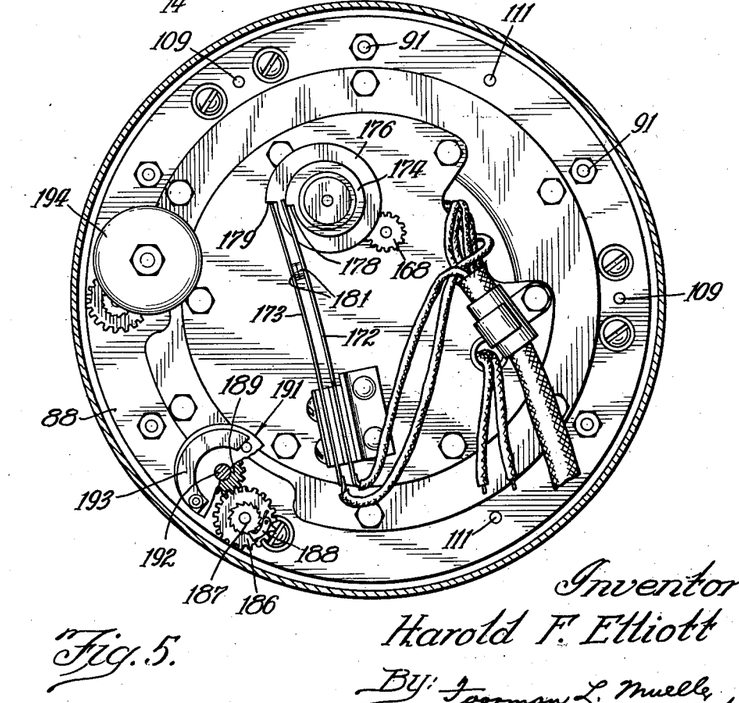
Fig. 5 is a rear elevation of a modified embodiment of my invention.

The electric clock 87, which, of course, controls the operation of the contactor unit 158 as well as the cam and switch mechanism as illustrated in Fig. 5, may be set by hand by means of a knob 185 operatively connected with the gear 177, through spring washer 177A and on shaft 167. The shaft 167 is connected through gears with the hands 92 and 93 of the clock and the contactor unit 158. Rotating the knob 185 also rotates the contactor unit 158. Included in this unit is disc D having the words "Day" and "Nite" thereon which are visible through an aperture A in the dial face as shown in Fig. 6. This enables the operator to ascertain whether the contactor unit is on the day or on the night portion of its complete twenty-four hour cycle.

As previously explained, the spiral spring 147 acts to return the station dial 116 and associated setting and cancelling mechanism from an operated position to an idle position as illustrated in Figs. 6 and 11. In order to retard this return movement, governor mechanism is provided on at least one lead screw in each of the two sets of lead screws, one set including the lead screws 109, and the other set the lead screws 111. The governor mechanism includes a gear 186 rotatably secured on the end of a lead screw as shown in Fig. 5 and a ratchet 187 concentric with the gear 186, but fixedly secured on the end of a lead screw. The gear 186 and ratchet 187 are connected together in one direction of rotation by a pawl 188 pivotally secured on the gear 186. The mounting of the pawl permits the ratchet 187 to pass the pawl on a setting or cancelling operation of a lead screw, but causes the pawl to engage the teeth of the ratchet 187 on the return movement from either of such operated positions. The gear 186 in turn is in mesh with a gear portion 189 on a rotatable member of governor unit 191, rotatably secured on a fixed pivot pin 192 secured to the frame plate 88 of the preselector frame. An arcuately shaped governor arm 193 is pivotally secured to the member 191 and upon rotation of the latter by the gear 186 upon the return movement of the lead screw, such arm 193 is thrown by centrifugal force against the inside of a stationary cup 194 fixedly secured on the pin 192. The friction intermediate the arm 193 and the cup 194 limits the speed of rotation of the lead screw which is rotating to an idle position, and this limitation on speed is effective on the other two lead screws of the particular set whose return movement is being retarded.

Although I have described my invention in its preferred embodiments, it is understood that the invention is not limited thereto, but changes and modifications may be made therein, all within the scope of the appended claims.

I claim:

1. A preselector including in combination, a stationary frame, a cage-like electrical conductor frame supported on said stationary frame and including a plurality of insulatingly separated axially extending conductors and cross-positioned annular conductors, an interconnector slidably carried on each axial conductor for individual selective connection with an annular conductor, rotary manual means for rotation in either a clockwise or counter-clockwise direction, means for operatively connecting said single rotary means with an individual interconnector to slide the same including a selector finger upon rotation of said rotary means in one direction, means for operatively connecting said rotary means with all of said interconnectors upon rotation of said rotary means in the other direction, and rotatable means independent of said rotary means for selecting an individual interconnector for sliding the same.

2. A preselector including in combination, a stationary frame, a cage-like electrical conductor frame supported on said stationary frame and including a plurality of insulatingly separated axially extending conductors and cross-positioned annular conductors, an interconnector slidably carried on each axial conductor for individual selective connection with an annular conductor, rotary manual means for rotation in either a clockwise or counter-clockwise direction, means including a selector finger for operatively connecting said rotary means with an individual interconnector to slide the same to set position upon rotation of said rotary means in one direction, means for operatively connecting said rotary means with all set interconnectors upon rotation of said rotary means in the other direction, and rotatable means independent of said rotary means for selecting an individual interconnector for sliding the same including a rotatably mounted notched member operatively connected with said selector finger for moving said finger therewith for alignment with a selected interconnector, and a manual knob operatively connected with said notched member for rotation to rotate said member.

3. A preselector including in combination, a stationary frame, a cage-like electrical conductor frame supported on said stationary frame and including a plurality of insulatingly separated axially extending conductors and cross-positioned annular conductors, an interconnector slidably carried on each axial conductor for individual selective connection with an annular conductor, rotary manual means for rotation in either a clockwise or counter-clockwise direction, means including a selector finger for operatively connecting said rotary means with an individual interconnector to slide the same to set position upon rotation of said rotary means in one direction, means for operatively connecting said rotary means with all set interconnectors upon rotation of said rotary means in the other direction, and rotatable means independent of said rotary means for selecting an individual interconnector for sliding the same including a rotatably mounted notched member for direct manual engagement on the periphery thereof operatively connected with said selector finger for moving said finger therewith for alignment with a selected interconnector.

4. A preselector including in combination a stationary cage-like conductor frame including a plurality of axially extending conductors mounted in an annular formation and insulatingly separated from one another, a plurality of annular insulatingly separated conducting rings extending transversely with reference to said conductors, an interconnector on each conductor for movement for selective contact with a ring, and means for selectively setting an interconnector including a rotatable selector finger, means for rotating and setting said finger in alignment with a selected interconnector, means for moving said finger axially to move the selected interconnector therewith including a rotatable gear having an arcuate slot therein, a manual dial, connecting means intermediate said dial and gear including lug means extending into said slot for engaging one end of said slot to rotate said gear by said engagement upon manual rotation of said manual dial.

5. A preselector including in combination a stationary cage-like conductor frame including a plurality of inter-crossed but insulatingly separated ring conductors and rod conductors, an interconnector on each rod conductor for selective engagement with a corresponding ring conductor, means for selectively setting interconnectors on said rod conductors in engagement with said ring conductors, and means for collectively moving said set interconnectors to a neutral position, said moving means including an axially moving ring, an insulating ring rotatably carried in said axially moving ring for direct contact with said interconnectors, a manual dial and means for operatively connecting said manual dial with said axially moving ring for moving the latter upon rotation of said manual dial, said operative connecting means including a rotatable gear having an arcuate slot therein and driving means intermediate said manual dial and gear fixed with reference to said manual dial for engaging one end of the arcuate slot to rotate said gear by said engagement upon rotation of said manual dial.

6. A preselector including in combination a stationary cage-like conductor frame including a plurality of rod-like conductors separated from one another, but fixedly mounted in a uniform formation, a movable contact on each conductor, means for individually setting said contacts at selected contact positions on said conductors, means for collectively moving said set contacts to neutral position, a rotary member for clockwise and counter-clockwise rotation, and means for operatively and selectively connecting said rotary member with said setting means and said moving means, including a pair of rotatable gears with one of said gears adapted for clockwise rotation and the other of said gears adapted for counter-clockwise rotation, connecting means intermediate said rotary member and both of said gears for connecting said member with one gear or the other depending upon the direction of rotation of said member, spring means intermediate said gears to normally apply a spring tension thereon in opposite directions for returning the particular gear rotated to idle position, and stationary stop means for stopping the return movement of the rotated gear at idle position.

7. A preselector including in combination a plurality of movable selector members, fixed means for mounting said selector members, a pair of axially movable but independently movable pushers, rotary means operatively connected with said pushers to selectively move one or the other to an opearted position upon rotation of said rotary means, spring means connected with said rotary means to return said rotary means and a selected pusher to idle position, and means for retarding the return movement of said rotary means, said retarding means including ratchet and gear means operatively connected with said rotary means, friction means connected with said gear and ratchet means, and a pawl for connecting said gear and ratchet means with said friction means upon said return movement but permitting operation of the rotary means independent of the friction means when moving a pusher to operated position.

8. A preselector including in combination a plurality of movable selector members, fixed means for mounting said selector members, a pair of axially movable pushers which are movable independently of one another, rotary means operatively connected with said pushers to selectively move one or the other thereof to an operated position upon rotation of said rotary means, spring means connected with said rotary means to return said rotary means and a selected pusher to idle position, and means for retarding the return movement of said rotary means, said retarding means including ratchet and gear means operatively connected with said rotary means, a rotatably mounted friction unit including a disc and a pivoted friction arm thereon, a pawl for connecting said gear and ratchet means with said friction unit upon said return movement but permitting operation of the rotary means independent of the friction unit when moving a pusher to operated position, and a stationary cup-shaped member mounted over said friction unit in a manner such that the friction arm thereon is thrown against the inside surface of said cup-shaped member upon the return movement of the rotary means to frictionally engage said inside surface and retard said return movement.

9. An electrical control device adapted to have an electrical control circuit extended therethrough including in combination, an annular frame for mounting conductors, a plurality of axially extending conductors mounted rigidly and insulatingly separated in said annular frame with a corresponding end of each of said conductors extending beyond said frame, a timing device adjacent said frame, and means for successively extending an electrical control circuit through said conductors including a pair of moving brushes electrically connected together and mechanically connected with said timing device, means for mechanically connecting said pair of brushes with said timing device, a plurality of stationary contacts spaced around said annular frame but insulated from said conductors and being fewer in number than said conductors with one of said brushes adapted to move from one successive contact to the next while the other brush is moving from one successive conductor to the next, with such other brush engaging successively and directly the extended end of each of said conductors, a slidable contact member on each conductor for selective movement to connect a selected conductor into a control circuit from said electrical control device upon engagement of said selected conductor by said other brush.

10. A preselector including in combination a stationary cage-like conductor frame comprising a plurality of axially extending rod-like conductors fixedly supported in an annular insulating portion of said frame in such a manner as to provide an open radial view down through said conductors, a plurality of ring-like conductors fixedly supported in a closed annular insulating portion of said frame within said rod-like conductors in a radial direction and visible through the rod-like conductor formation, a slideable contact member on each rod-like conductor, axially movable means outside said rod-like conductors including a selector finger for engaging with a single contact member to axially slide the same to a contact position, and an annular axially movable unit for engaging all of the moved contact members to collectively return the same to idle position, and driving and guide means for said axially movable means spaced apart in such a manner as to provide a relatively open formation and permit ready inspection directly to the ring-like conductors.

10. A preselector including in combination a stationary cage-like conductor frame including a plurality of inter-crossed but insulatingly separated ring conductors and rod conductors, an interconnector on each rod conductor for selected contact with a corresponding ring conductor, means for selectively and individually setting interconnectors on said rod conductors in contact with said ring conductors, said setting means including a rotatable selector finger and an axially but non-rotatably moving follower for carrying said selector finger, means for collectively returning set interconnectors to idle position and thereby cancelling said contacts, said cancelling means including a rotatable ring and an axially but non-rotatably moving follower for carrying said ring, rotatable means for manually rotating said selector finger and connecting means intermediate said rotary means and said finger passing through said rotatable cancelling ring whereby said finger and said cancelling ring rotate simultaneously in said followers upon rotation of said rotary means, and dial means operatively connected with said followers adapted for clockwise and counter-clockwise rotation to axially drive one follower at a time, the follower driven depending upon the direction of rotation of said dial means.

12. A preselector including in combination a stationary cage-like conductor frame including a plurality of rod-like conductors separated from one another, but fixedly mounted in a uniform formation, conductor portions adjacent said conductors a movable contact on each conductor with each contact resting normally in starting position and being movable from such position to a contact position at which it engages a conductor portion, a setting means for individually moving a contact on a selected conductor to a contact position, cancelling means for returning said contact to starting position, and rotary means for operative connection selectively with said setting means and said cancelling means, said rotary means including a rotatably mounted support disc, a rotatable setting gear and a rotatable cancelling gear each rotatable independently of the other and independently of the support disc, said support disc having a driving projection fixedly carried thereon, each of said gears having an arcuate slot therein and with said slots extending in substantially opposite directions with reference to one another, with said gears normally standing in idle position with one end of each slot in an adjacent position and with said driving projection from said support disc extending through said slots and engaging said adjacent ends thereof, a stationary stop extending through both of said slots in alignment with said driving projection when the gears are in idle position, and a spring intermediate said two gears for returning one gear or the other from an operated position to idle position with such returned gear being limited in such return movement by the stationary stop.

13. A preselector having coordinate conductors with sliding interconnectors and a setting mechanism comprising a plurality of lead screws spaced around and parallel with a central axis, a gear and pinions for rotating some of said lead screws in unison in one direction, a second gear and pinions for rotating the remaining lead screws in the opposite direction, said gears having slots permitting opposite rotation from a central position, a stationary stop projecting into said slots establishing a position of rest for the gears, a spring interconnecting said gears and causing the same to rest normally against said stop, a rotary dial, a drive projection on said dial and in said slots for driving the gears separately in opposite directions by opposite rotation of the dial, a follower ring mounted upon said some lead screws and driven axially by their rotation, a plurality of interconnectors with an interconnector mounted on each of some of said coordinate conductors, a selector finger mounted upon said follower ring for moving interconnectors individually, rotary indicating means and a pin operatively connected therewith for moving said selector finger in said follower ring to select an individual interconnecter to be moved, a second follower mounted on said remaining lead screws and a ring mounted on said second follower for moving the interconnectors collectively to a starting position.

14. A preselector comprising a plurality of rod-like conductors spaced in a cylindrical frame around a central axis, ring conductors on one side of the rod-like conductors spaced along said axis in another frame concentric with the first said frame, an interconnector sliding on each rod conductor for cross connecting said rod conductor and a selected ring conductor, a selector finger for moving interconnectors individually, an index ring concentric with the central axis having connecting means intermediate said ring and said selector finger for rotating the selector finger with the ring to select an individual interconnector, spaced lead screws grouped around the central axis and parallel therewith, manual means for driving said lead screws in unison, a follower operated by the lead screws for moving the selector finger and a selected interconnector axially, a second manual means, means for limiting the rotary movement of said second manual means, a second set of lead screws, a second follower spaced around the central axis, means for operatively connecting said second follower and said second manual means and a cancelling ring actuated by said second follower for moving the interconnectors collectively to a starting position.

15. A preselector including in combination, a frame, a rotatable function index unit on said frame having a stop portion on the peripheral edge thereof, a rotatable time index unit on said frame, a plurality of interconnectors slidably mounted on said frame, setting means operatively connected with said function index unit for individually sliding said interconnectors, positioning means operatively connected with the time index unit for positioning the setting means in a full set position adjacent a selected interconnecter to be moved, pivotal means intermediate the function index unit and the time index unit at the peripheral edge of each and in continuous engagement with the peripheral edge of the time index unit, with said pivotal means adapted to be pivoted substantially into engagement with the peripheral edge of the function index unit at the stop portion thereof and pivoted sufficiently to permit rotation of the time index unit only when the function index unit is in neutral position, with said pivotal means having means for locking engagement with said function index unit at the stop portion to prevent rotation of the function index unit when the time index unit is not in a full set position.

16. A preselector including in combination, a frame, a rotatable station unit on said frame having a notch on the peripheral edge thereof, a rotatable time unit on said frame, a plurality of interconnectors slidably mounted on said frame, setting means operatively connected with said station unit for individually sliding said interconnectors, positioning means operatively connected with the time unit for positioning the setting means in a full set position adjacent a selected interconnector to be moved, pivotal means intermediate the station unit and the time unit at the peripheral edge of each including a pivoted member having a roller at one end thereof in continuous engagement with the peripheral edge of the time unit, and having a finger at the other end thereof for movement into said peripheral edge notch, with said member adapted to be pivoted substantially into engagement with the peripheral edge at said notch of the station unit and sufficiently to permit the rotation of the time unit only when the station unit is in idle position with said peripheral edge notch in position to receive said finger, and with said finger adapted for engagement with said peripheral edge notch to prevent rotation of the station unit when the time unit is not in a full set position.

17. A preselector including in combination, a frame, a rotatable station unit on said frame having a notch on the peripheral edge thereof, a rotatable time unit on said frame, a plurality of interconnectors slidably mounted on said frame, setting means operatively connected with said station unit for individually sliding said interconnectors, positioning means operatively connected with the time unit for positioning the setting means adjacent a selected interconnector to be moved, means for preventing the movement of either the station unit or the time unit when the other unit is not in a normal idle position, said means including a pivoted unit on said frame adjacent the peripheral edge of the station unit and the time unit including a roller at one end in continuous engagement with the peripheral edge of the time unit and having a locking end at the other end thereof for engagement in the notch in the peripheral edge of said station unit, with said pivoted unit adapted to be pivoted sufficiently to permit the rotation of the time unit only when the station unit is in idle position with the locking end in alignment with the peripheral edge notch, and with the peripheral edge of said station unit on each side of the peripheral edge notch and over the entire remainder thereof being of such a dimension such as to stop the locking end and prevent pivotal movement of said pivoted unit when the station unit is out of idle position so as to prevent rotary movement of the time unit.

18. Mechanism for preselecting a plurality of operations including a plurality of linearly moving members to be selectively set to predetermined positions, means for selectively setting said moving members being movable in a linear direction during each setting movement, means for collectively returning set members to starting position being movable in a linear direction during the returning movement, rotary means operatively common to said setting means and said returning means, and means for selectively operatively connecting said rotary means with said setting means or said returning means.

19. In preselector apparatus having frame means and a plurality of movable members supported on said frame means for selective movement to preselected operating positions, mechanical means operated solely by manual force to move said members to operating positions including a first manual rotary member, a second manual rotary member, and mechanical connecting means having at least one portion thereof operatively common to both rotary members and to a selected movable member for entirely mechanically transmitting the manual force on at least one of said rotary members directly to the selected movable member to move said movable member and with said portion being moved selectively by both rotary members.

20. Manually operated setting means for a preselector device having a stationary frame and a plurality of sliders slidably mounted on said stationary frame for controlling the operation of the preselector, said means comprising a pusher for moving the sliders individually, manually operated means for moving the pusher to select and align said pusher with an individual slider, second manually operated means operatively connected with said pusher for actuating the pusher to move the selected slider to a selected position on said stationary frame, and mechanical means operatively connecting said second manually operated means and said pusher and being the sole means for transmitting the manual force on said second manually operated means to said pusher.

21. In mechanism for preselecting and initiating a plurality of operations at timed intervals including frame means having thereon, a clock, continuously moving control means operated by the clock and a plurality of settable members on a stationary portion of the frame means, the combination of a mover to be moved to alignment with a settable member on the stationary portion of the frame means, manual means for accomplishing such alignment, manual rotary means, and connecting means between said manual rotary means and said mover for entirely mechanically transmitting the manual force on said manual rotary means to said mover to move the aligned settable member to a predetermined position, with the aligning operation and member moving operation both being accomplished while continuing the normal operation of the clock and the control means continuously moving therewith.

22. In timing and control mechanism comprising a stationary frame, a clock, circuit closing and circuit routing means operated by said clock, and sliders for controlling the circuit routing means being slidable on the stationary frame, the combination of a pusher for moving the sliders directly, means for directing the pusher to a position adjacent a selected slider slidable on the stationary frame, and means mounted on the stationary frame for actuating the pusher to move a selected slider to a selected position, said last two means consisting of mechanical parts operated by manual force, with said operation of selecting and setting the sliders being carried out with the clock, circuit closing, and circuit routing means in continuous operation.

23. A control mechanism including stationary frame means, a plurality of sliders mounted directly on such stationary frame means and being slidable thereon, a pusher, manual means for moving the pusher to align it with a selected slider, second manual means operatively connected with said pusher for moving the pusher to move the selected slider to a predetermined position, entirely mechanical means for accomplishing said operative connection, and single spring means operatively connected with said second manual means for returning said second manual means and the pusher therewith to starting position.

24. In mechanism for performing a plurality of predetermined operations including a plurality of movable members adapted to be selectively moved to predetermined positions corresponding to such predetermined operations, the means for putting such mechanism in performing condition and accomplishing said selective moving of said movable members in only two manual operations by an operator, including mover means for selectively moving said movable members, manually operated means for aligning a selected member and said mover means in one operation, second manually operated means, and mechanical means operatively connecting said mover means and said second manually operated means to alone transmit a manual actuating force applied on said second manually operated means to said mover means in a second operation to move said mover means and move the selected movable member.

25. In mechanism for performing a plurality of predetermined operations including a stationary frame, and a plurality of slider members slidably mounted on said stationary frame, the means for putting such mechanism in performing condition and accomplishing in only two manual operations selective positioning of the slider members, said means including a pusher member for selectively moving the slider members, manually operated means operatively connected with one of said members as between a pusher member and said slider member for effecting in one operation alignment between the pusher and a selected slider, and second manually operated means for actuating the pusher in the second operation to move the selected slider to a selected position on said frame for performing a predetermined operation at such position, with both of said manually operated means entirely comprising mechanical elements actuated through manual force applied to said means selectively, mechanical means operatively connecting said first manually operated means with said one of said members, and second mechanical means operatively connecting said manually operated means and said pusher member.

26. A circuit closing and routing mechanism for selectively energizing operating circuits including a stationary frame, means for closing a circuit through said mechanism at periodic intervals, means for routing such circuit to selected operating circuits, said last means comprising a plurality of sliders in circular formation on said stationary frame, an actuator selectively connectible with said sliders, mechanical means operated entirely manually including said actuator for selecting and moving the sliders individually, rotary means mounted on the stationary frame operatively connected with said actuator for moving said actuator to effect alignment between said actuator and a selected slider, and second rotary means movable independently of the first rotary means and operatively connected with said actuator for operating the actuator to move the selected slider to a predetermined position.

27. In a preselector having a plurality of sliders for controlling circuit routing, a mechanism for selecting and setting said sliders to predetermined positions by two manual operations while the preselector is in operation, said mechanism comprising a pusher for moving the sliders individually, a manually operated member for directing the pusher to a selected slider by a rotary motion, a second manually operated member for advancing the pusher to move the selected slider to a predetermined position by a second rotary motion, and entirely mechanical means operatively connecting said pusher with said second manually operated member to entirely mechanically transmit the manual force on said latter member to said pusher.

28. A control mechanism comprising two concentric dial means, a plurality of movable control members grouped around the axis of the dials, a pusher rotatable about said axis for moving the control members individually, manual means including one of said dial means for rotating the pusher about the axis to align it with a selected control member, and means for indicating the position of the pusher, manually propelled advancing means for moving the positioned pusher in a direction to move a selected movable control member to a selected position, mechanical means operatively connecting said manually propelled advancing means and the other of said dial means to move the positioned pusher upon operation of said other dial means, an indicator on said other dial means for indicating such selected position of each movable control member, and means for automatically retracting the advancing means and the pusher and the other dial means to a starting position.

29. Control mechanism for setting up a predetermined program of operations including frame means, a plurality of individually slidable operation determining members slidably mounted on said frame means, and all movable within the same substantially longitudinally spaced limits, an annular unit on said frame means operatively common to all of said members and normally positioned at one outside limit of movement thereof, a second annular unit common to all of said members and normally positioned at the other limit of movement thereof, means on one of said two units engageable selectively and individually with a member program index means rotatable clockwise and counterclockwise and operatively common to both said annular units, means operatively connecting said program index means with said one of said annular units to individually move said members to a set position, and means operatively connecting program index means to the other of said annular units to collectively move all of said members which are in a set position within the longitudinal limits of movement thereof.

30. A control mechanism including frame means having a slider member mounted thereon and slidable over a substantially linear path, and means for setting said slider member in a predetermined position on the substantially linear path while the control device is in operation, said means including a pusher member engageable with the slider member, manually operated rotary means operatively connected with one of said two members, mechanical means operatively connecting said manually operated rotary means and said one member to align the two members upon operation of said manually rotary operated means, a second manually operated rotary means operatively connected with the pusher member to move said pusher member and thereby move said slider member to a predetermined position on the substantially linear path, and mechanical means operatively connecting said second manually operated rotary means and said pusher member to mechanically transmit the manual movement of said second rotary means to said pusher.

HAROLD F. ELLIOTT.